Dec. 6, 1932.   A. G. PERKINS   1,889,790
TRACK FOR PIPE JOINT SEALING TOOLS
Filed March 10, 1930
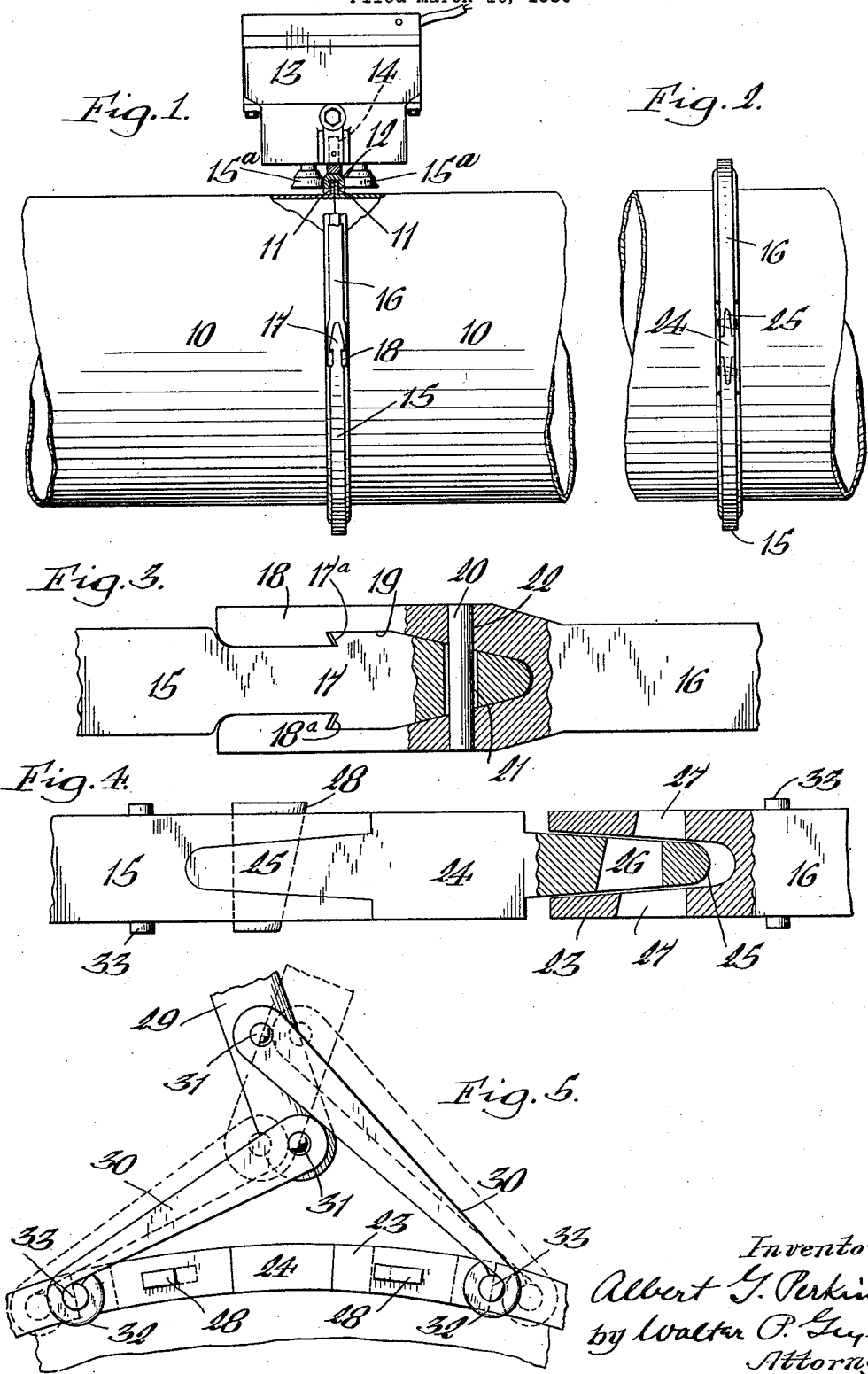

Patented Dec. 6, 1932

1,889,790

UNITED STATES PATENT OFFICE

ALBERT G. PERKINS, OF BUFFALO, NEW YORK

TRACK FOR PIPE JOINT SEALING TOOLS

Application filed March 10, 1930. Serial No. 434,681.

This invention relates to a track or guiding device which is intended more particularly for use in connection with a pipe-joint sealing tool of the type adapted to travel about the joint to seal it.

One of its objects is the provision of a track of this character which has been designed with a view of readily effecting its application and removal to and from the joint to be sealed, and which at the same time is simple and inexpensive in construction.

Another object of the invention is to provide a sealing tool track having novel and effective means for coupling its sections to one another about the joint to be sealed, such means being disposed so as not to interfere with the continuous movement of the tool about the joint.

In the accompanying drawing:—

Figure 1 is a side view of a pair of jointed pipe-sections, partly in section, showing the improved track encircling the same and the tool for sealing the joint. Figure 2 is a similar view showing the track viewed from the opposite side to that shown in Figure 1. Figure 3 is an enlarged fragmentary, sectional, top plan view of one of the jointed ends of the track-sections. Figure 4 is a similar view of the other jointed ends of the track-sections, the joint being partially uncoupled. Figure 5 is a side view showing one form of means for coupling or drawing together the jointed ends of the track-sections depicted in Figure 4.

Similar characters of reference indicate corresponding parts throughout the several views.

By way of example, my invention has been shown in connection with a joint for sealing pipe-sections such as are employed in water pipe lines and the like. These pipe-sections which may be made of steel, are indicated at 10, 10, and are provided at their ends with annular flanges 11 disposed at substantially right angles to the axis of the pipe. When the mating ends of the pipe-sections are brought together, their flanges are disposed side by side in abutting relation for fastening them about their entire circumference to produce a rolled or swedged joint capable of withstanding high pressure. Applied to the abutting flanges to couple them into sealing engagement is a split coupling ring or band 12 having a circumferential groove in its inner side for receiving the marginal portions of such flanges, as shown in Figure 1. After fitting the grooved coupling ring about the flanges, the same is firmly pinched or compressed laterally against the flanges by a rolling or swedging operation performed by a suitable tool 13, which may be constructed in accordance with the one shown in my United States Letters Patent, No. 1,743,477, dated January 14, 1930.

The operating elements of this tool, which is propelled by power about the joint to seal the ring 12 to the pipe-flanges 11, consists of a guide roller 14 and opposing pressure rollers 15a arranged to bear against opposite sides of the ring, as seen in Figure 1, and as the tool revolves, said rollers compress the ring into firm sealing engagement with the pipe-flanges.

In traveling about the joint, the tool is guided on a track encircling the periphery of the coupling ring 12. The preferred type of track, which constitutes the subject matter of this application, is composed of a plurality of sections 15, 16, two being shown in the drawing, but it is to be understood that any number of sections may be employed, depending on the diameter of the pipes to be jointed. These sections are semi-circular in form and together are adapted to encircle the coupling ring in the manner shown in Figures 1 and 2 to provide a continuous track over which the guide roller 14 of the sealing tool travels. One end of the track-section 15 terminates in a tongue-like coupling element 17 and the opposing end of the other track-section 16 terminates in a fork 18 to provide a correspondingly-shaped notch 19 for interlocking these ends of the sections from pulling apart. The companion tongue and notch are approximately T-shaped in plan and they are held in interlocked relation against movement radially of the pipe by a pilot or hinge pin 20 engaging alining openings 21, 22, there being sufficient play allowed between the ends of the tongue and its notch and between the pin and the tongue-opening 20, as shown in Figure 3, to permit of a slight angular movement of the track-sections relative to each other. The abutting strain-receiving shoulders 17$^a$ and 18$^a$ of the coupling element 17 and fork 18 are preferably undercut to resist any tendency of the track-sections at this point to spread or pull apart.

The other ends of the track-sections are so jointed or coupled as to permit them to be drawn snugly about the coupling ring 12 and then interlocked. For this purpose, these opposing ends of the track-sections are forked, as indicated at 23 in Figure 4, and adapted to be interlocked therewith is an insert or coupler 24 having tongues 25 projecting from its opposite ends for engagement with the forked ends of said track-sections. The insert-tongues and forked track-ends have transverse openings 26 and 27, respectively, for receiving either tapered or straight keys 28 which function to detachably hold these parts together, the keys being preferably so disposed as to receive the circumferential strain at right angles to the center line of the track.

In the final coupling of the sectional track to the ring 12, the free end of the track, shown at the right in Figure 3, is drawn toward the opposing free end of the insert 24, after which the corresponding key is driven into place to hold the track in place.

Any suitable means may be employed for thus drawing the track about the ring, that shown in Figure 5 of the drawing consisting of a tool including a hand lever 29 having oppositely-facing coupling arms 30 fulcrumed on spaced pivots 31 to the lower end of said lever, the free ends of the arms terminating in eyes or hooks 32 adapted to engage corresponding lugs or pins 33 projecting from those opposing ends of the track-sections which are coupled to the insert 24. Upon pulling the lever from the dotted line position to the full line position shown in Figure 5, the hooked arms 30 are urged toward each other to contract the track snugly about the coupling ring, after which the respective key 28 is applied and the contracting tool is removed.

By this construction, a continuous guide track for the sealing tool is provided which may be readily applied to and removed from the pipe joint in a minimum period of time and with very little effort, which does not in any way interfere with the movement of the tool about the same during the sealing of the joint, and which is strong and durable in construction.

In certain kinds of pipe line work, it is advantageous to have the joint disposed internally of the pipe-sections rather than externally, as shown in the drawing, and in this event the track can be just as conveniently applied to the inner periphery of the coupling ring and expanded into place about it.

I claim as my invention:—

1. In a jointing device of the character described, an annular sectional track adapted for detachable application to the joint in overlying relation thereto and adapted to guide a sealing tool thereover, means for coupling the track-sections at one of their opposing ends, and means for detachably connecting said sections at the other of their opposing ends, said last-named means being constructed to interfit in a circumferential direction and including devices for receiving a tool to effect the final contraction of the sections about the joint.

2. In a jointing device of the character described, an annular sectional track adapted for detachable application to the joint in overlying relation thereto and adapted to guide a sealing tool thereover, means for coupling the track-sections at one of their opposing ends, and means for detachably connecting said sections at the other of their opposing ends, said last-named means including a coupling member, and anchoring elements for connecting said member to the opposing ends of the track-sections.

3. In a jointing device of the character described, an annular sectional track adapted for detachable application to the joint in overlying relation thereto and adapted to guide a sealing tool thereover, means for coupling the track-sections at one of their opposing ends, the other opposing ends of said sections being forked to provide oppositely-facing notches, and a coupling member disposed between said forked ends and having tongues for detachable engagement with the notches thereof.

4. In a jointing device of the character described, an annular sectional track adapted for detachable application to the joint in overlying relation thereto and adapted to guide a sealing tool thereover, means for coupling the track-sections at one of their opposing ends, the other opposing ends of said sections being forked to provide oppositely-facing notches, a coupling member insertable between said forked ends and having tongues engageable with the notches thereof, said forked ends and said tongues having alining transverse openings therein and keys engageable with said openings for detachably connecting the coupling member to the track-sections.

5. In a jointing device of the character described, an annular sectional track adapted for detachable application to the joint in overlying relation thereto and adapted to guide a sealing tool thereover, means for coupling the track-sections at one of their opposing ends, and means for coupling said sections at the other of their opposing ends, said last-named means including a substantially T-head formed at the end of one section, a correspondingly shaped notch at the end of the companion section for receiving said head, and means for holding such interfitted parts against relative displacement radially of the joint.

6. An annular guide track of the character described, comprising a pair of sections, one section terminating at its ends in substantially fork-shaped connecting portions and the second section terminating at one end in a coupling head engageable with one of the forked ends of the first-named section to prevent the sections from pulling apart, the second section terminating at its other end in a forked-shaped connecting portion, and a coupling insert connecting the remaining forked end of the first track-section with the companion forked end of the second section.

7. An annular guide track of the character described, comprising a pair of sections, one section terminating at its ends in substantially forked-shaped connecting portions and the second section terminating at one end in a coupling head engageable with one of the forked ends of the first-named section to prevent the sections from pulling apart, the second section terminating at its other end in a forked-shaped connecting portion, a coupling insert provided at its ends with tongues adapted to connect the remaining forked end of the first track-section with the companion forked end of the second section, and removable keys for fastening the coupling insert to such forked ends.

ALBERT G. PERKINS.